(12) United States Patent
Wang (10) Patent No.: US 9,616,913 B2
(45) Date of Patent: Apr. 11, 2017

(54) DIRECTION SETTING DEVICE FOR THE SEAT OF A BABY STROLLER

(71) Applicant: Li-Te Wang, Tainan (TW)

(72) Inventor: Li-Te Wang, Tainan (TW)

(*) Notice: Subject to any disclaimer, the term of this patent is extended or adjusted under 35 U.S.C. 154(b) by 211 days.

(21) Appl. No.: 14/582,251

(22) Filed: Dec. 24, 2014

(65) Prior Publication Data

US 2016/0039448 A1 Feb. 11, 2016

(30) Foreign Application Priority Data

Aug. 11, 2014 (CN) .................... 2014 2 0450633 U (51) Int. Cl.
*B62B 9/10* (2006.01)
*B62B 9/14* (2006.01)
*B62B 7/14* (2006.01)
*B62B 9/12* (2006.01)

(52) U.S. Cl.
CPC .............. *B62B 9/104* (2013.01); *B62B 9/102* (2013.01); *B62B 9/14* (2013.01); *B62B 9/142* (2013.01); *B62B 7/14* (2013.01); *B62B 9/12* (2013.01)

(58) Field of Classification Search
CPC  B62B 9/104; B62B 9/102; B62B 9/14; B62B 9/142; B62B 9/12; B62B 7/14
See application file for complete search history.

(56) References Cited

U.S. PATENT DOCUMENTS

| | | | | |
|---|---|---|---|---|
| 3,808,616 | A * | 5/1974 | White | A47C 17/045 297/377 |
| 5,087,066 | A * | 2/1992 | Mong-Hsing | B62B 7/06 280/47.38 |
| 5,384,923 | A * | 1/1995 | Hwang | A47C 1/143 297/380 |
| 6,155,647 | A * | 12/2000 | Albecker, III | A47C 1/146 297/228.12 |
| 6,913,312 | B2 * | 7/2005 | Clary | A47C 1/146 297/118 |
| 7,600,775 | B2 * | 10/2009 | Chen | B62B 7/14 280/642 |
| 8,414,012 | B2 * | 4/2013 | Chen | B62B 7/145 280/47.4 |
| 2005/0051998 | A1 | 3/2005 | Hsia | |
| 2005/0258673 | A1 | 11/2005 | Kassai et al. | |
| 2006/0284456 | A1 * | 12/2006 | Compton | B60N 2/286 297/184.13 |

(Continued)

*Primary Examiner* — David R Dunn
*Assistant Examiner* — Tania Abraham
(74) *Attorney, Agent, or Firm* — Alan D. Kamrath; Kamrath IP Lawfirm, P.A.

(57) ABSTRACT

A direction setting device for the seat of a baby stroller includes the main backrest providing an auxiliary backrest whose bottom end is sewed with the seat fabric to form a sewing thread line via which the auxiliary backrest moves to the front end of the frame to change the seat direction. A a rear canopy is secured on the sunshade, and a switching line for turning over the rear canopy to change the direction forms at the joints of the rear canopy and the sunshade. The rear canopy is fastened to the auxiliary backrest and to the footrest respectively by a fastening element after the seat direction is switched, so that the sunshade may simultaneously change its direction. Furthermore, the tilting angle of the auxiliary backrest may be controlled by adjusting the elevation angle of the footrest.

6 Claims, 15 Drawing Sheets

(56) References Cited

U.S. PATENT DOCUMENTS

| | | | |
|---|---|---|---|
| 2008/0179848 A1 | 7/2008 | Lake | |
| 2011/0175406 A1* | 7/2011 | Zeng | B62B 9/104 297/183.1 |
| 2012/0062001 A1* | 3/2012 | Krasley | B60N 2/2845 297/184.13 |
| 2014/0183843 A1* | 7/2014 | Iftinca | B62B 7/06 280/647 |

* cited by examiner

DIRECTION SETTING DEVICE FOR THE SEAT OF A BABY STROLLER

BACKGROUND OF THE INVENTION

Field of the Invention

The present invention relates to a direction setting device for the seat of a baby stroller and, more specifically, to a direction setting device for the seat of a baby stroller providing the function that the sunshade of the baby stroller may simultaneously change its direction after the direction of the seat of the baby stroller is changed.

Description of the Prior Art

It is more flexible to use a baby stroller if the direction of the backrest of the baby stroller is allowed to be changed to switch the riding direction of the baby on the stroller to allow the baby to face the pusher or not according to the users' requests.

The baby stroller disclosed in the prior art may only be operated to change its backrest direction, but the direction of its sunshade is not able to be changed after the backrest direction of the prior art is switched. That is, the sunshade arranged on the top of the prior art baby stroller for sun protection is not allowed to simultaneously change its direction after the seat direction of the prior art baby stroller is changed. Consequently, the sunshade of the prior art baby stroller will lose some of its sun-protective ability and weaken the effectiveness of sun protection. In order to enable the sunshade to change its direction, some stroller manufacturers suggest removing the whole sunshade apparatus from the frame and then re-assembling in the other direction, or interchanging the front and the rear ribs supporting the sunshade cloth by turning, or directly mounting another piece of sunshade apparatus in the other direction of the backrest.

The aforesaid mode disclosed in the prior art is inconvenient for the users, so that it needs to improve. Moreover, the angle of the backrest after being changed in direction is controlled by a plate mechanism for tilting the backrest according to the prior art, and to equip with such a plate mechanism for tilting the backrest may result in the product cost increasing. Thus, the prior art with the mentioned disadvantage also needs to be ameliorated.

SUMMARY OF THE INVENTION

It is against the background and the drawbacks associated therewith that the present invention has been developed.

It is a primary objective of the present invention to provide a direction setting device for the seat of a baby stroller that allows the sunshade of the baby stroller to simultaneously change its direction after the direction of the seat of the baby stroller is switched.

In order to achieve the aforesaid objective, a direction setting device for the seat of a baby stroller disclosed in the present invention includes a frame, a seat inside the frame, a main backrest, a footrest arranged under the front end of the frame, and a sunshade arranged at the top of the frame and supported by a front sunshade rib and a rear sunshade rib. A rear canopy has one side secured on the top surface of the sunshade between the front and rear sunshade ribs, a switching line for turning over the rear canopy is formed at the joints of the rear canopy and the sunshade, and the other side of the rear canopy is provided with a bottom end hanging down. Each bilateral side of the rear canopy relating to and extending along the rear sunshade rib is provided with a slit whose bilateral edges are fastened to each other by a fastening element. Moreover, the auxiliary backrest, the footrest and the rear canopy are fastened together after the rear canopy is turned over to the front side of the frame.

The side of the main backrest facing the front end of the frame is provided with an auxiliary backrest, which is a fabric cover stuffed with a supporting member and whose bottom end is sewed together with the seat fabric arranged on the frame to form a sewing thread line. Thus, the auxiliary backrest may move to the front end of the frame via the sewing thread line to change and set the direction of the seat.

The rear canopy is fastened to the auxiliary backrest and to the footrest respectively by another fastening element after the direction of the baby seat is switched.

The fastening elements are velcro strips.

The footrest is adjustable to multiple elevation angles, and the tilting angle of the auxiliary backrest is controlled by adjusting the elevation angle of the footrest.

It is the advantage that the present invention provides a simple and convenient mode for the stroller users to switch the direction of the sunshade on the baby stroller without changing the frame of the baby stroller. Furthermore, the user may control the tilting angle of the auxiliary backrest by adjusting the elevation angle of the footrest after the direction of the seat of the baby stroller is switched.

BRIEF DESCRIPTION OF THE DRAWINGS

In order that the present invention may be more fully understood, a preferred embodiment thereof will now be described with reference to the accompanying drawings, in which.

DESCRIPTION OF THE PREFERRED EMBODIMENTS

The means for achieving the aforesaid objective and the functions of the present invention will become apparent from the following description, taken in connection with the accompanying drawings, wherein a preferred embodiment of the present invention is disclosed.

Figure 1:
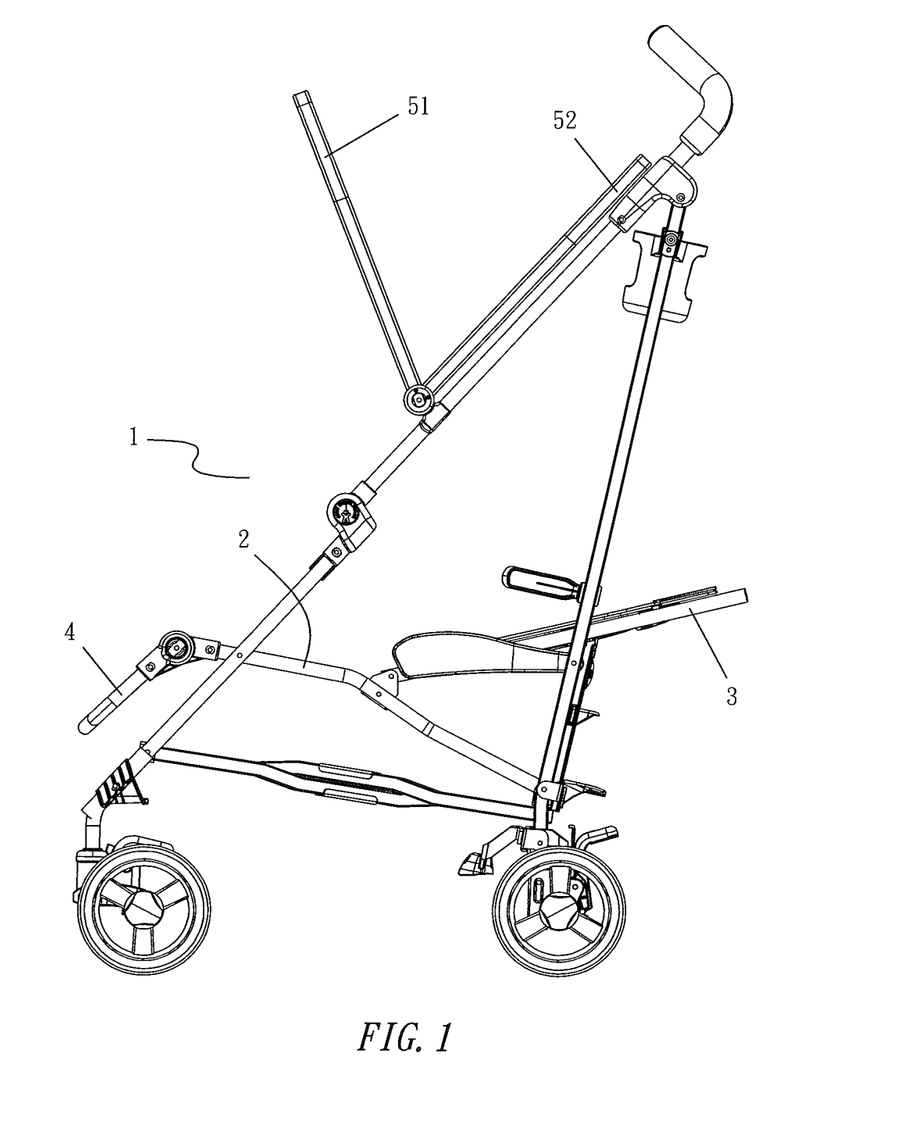
FIG. 1 is a side view of the frame according to the preferred embodiment of the present invention.
Figure 2:
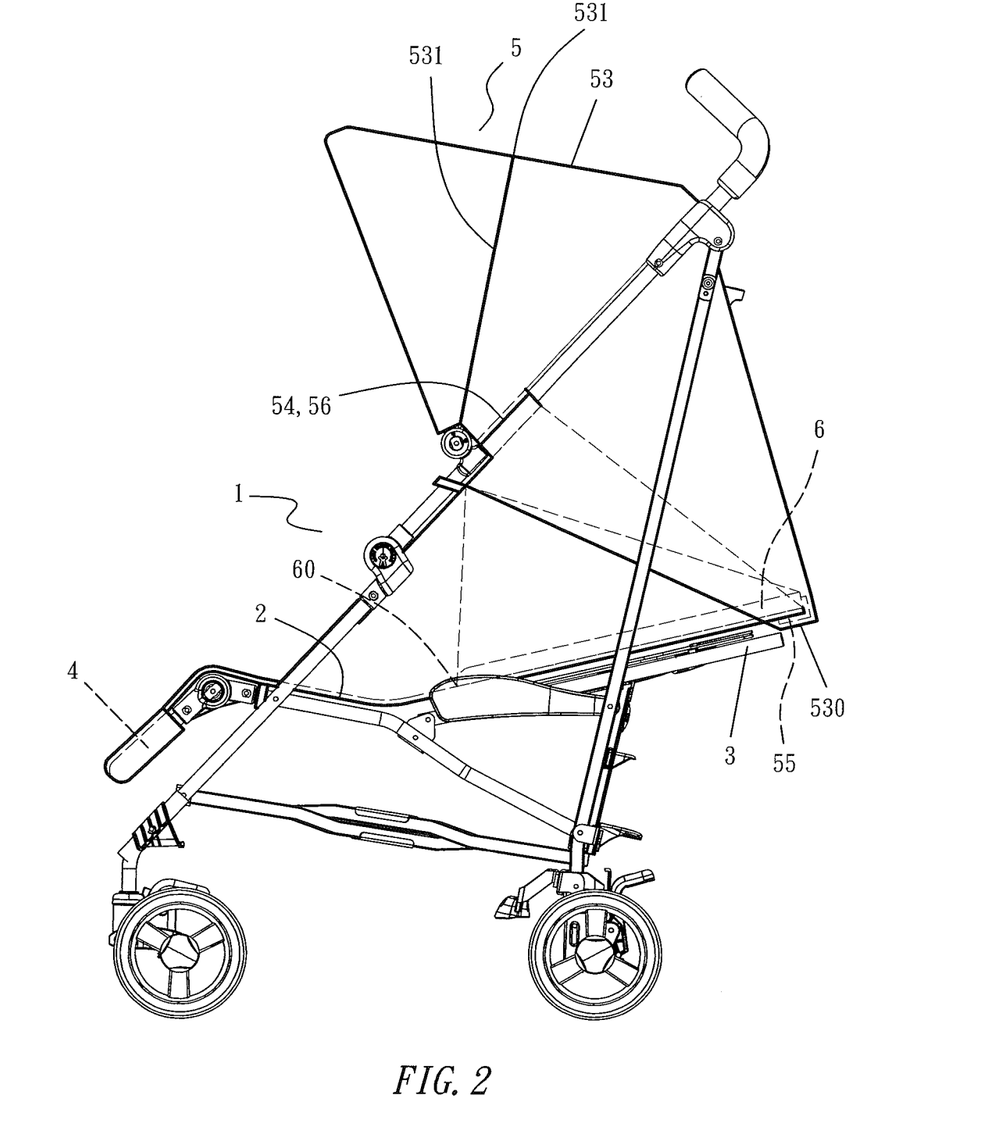
FIG. 2 is a side view showing the preferred embodiment of the present invention arranged with a sunshade.
Figure 3:
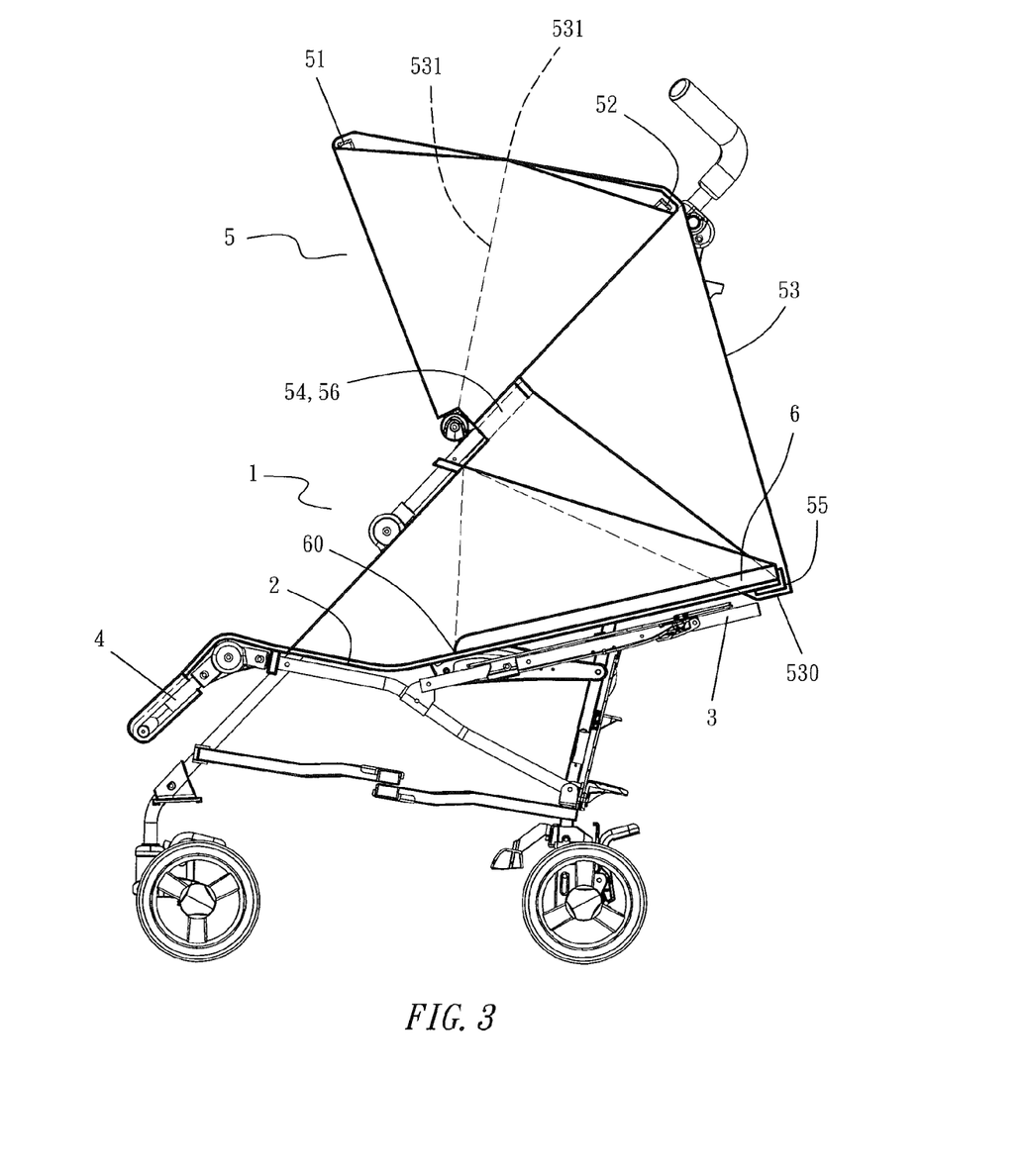
FIG. 3 is a sectional side view of the preferred embodiment according to the present invention.

Referring to FIGS. 1 to 3, the baby stroller includes a frame 1, a seat 2 inside the frame 1, a main backrest 3, a footrest 4 arranged under the front end of the frame 1, and a sunshade 5 arranged at the top of the frame 1 and supported by a front sunshade rib 51 as well as a rear sunshade rib 52.

The side of the main backrest 3 facing the front end of the frame 1 is provided with an auxiliary backrest 6, which is a fabric cover stuffed with a supporting member and whose bottom end is sewed together with the seat fabric arranged on the frame 1 to form a sewing thread line 60. Thus, the auxiliary backrest 6 may move to the front end of the frame 1 via the sewing thread line 60 to change and set the direction of the seat.

The footrest 4 is adjustable to multiple elevation angles.

The sunshade 5 wraps on and between the front sunshade rib 51 and the rear sunshade rib 52. A rear canopy 53 has one side secured on the top surface of the sunshade 5 between the sunshade ribs 51 and 52. A switching line 531 forms at the joins of the rear canopy 53 and the sunshade 5. The other side of the rear canopy 53 is provided with a bottom end 530 hanging down, and the bottom end 530 is fastened to the outer surface of the top end of the auxiliary backrest 6 by a first fastening element 55 which may be a velcro strip. Moreover, the bilateral sides of the rear canopy 53 relating to and extending along the rear sunshade rib 52 are respectively provided with a slit 54 whose bilateral edges are fastened to each other by a second fastening element 56, such as a velcro strip.

Figure 4:
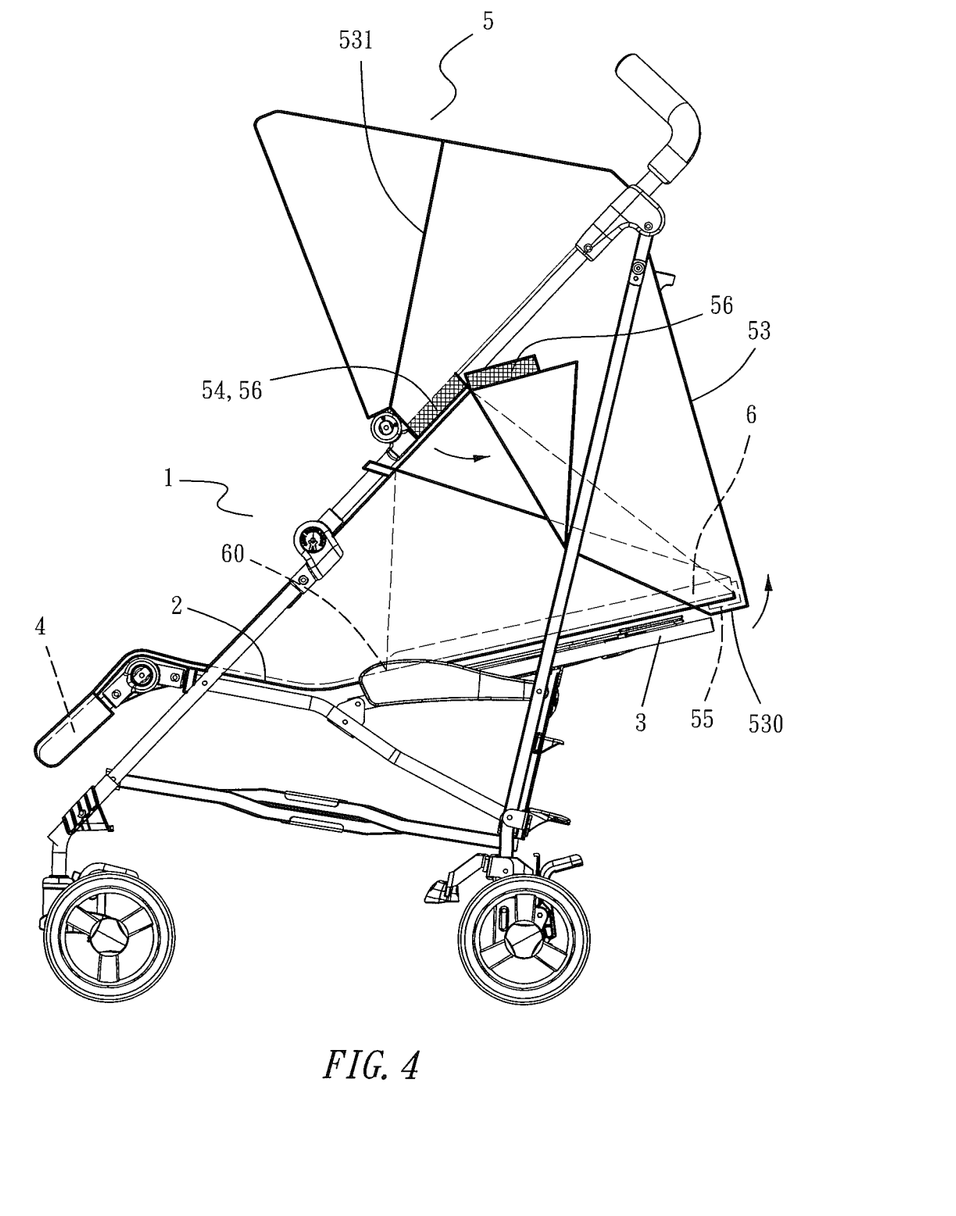
FIG. 4 is a first schematic drawing depicting the movements how the direction of the baby stroller seat is changed according to the preferred embodiment of the present invention.
Figure 5:
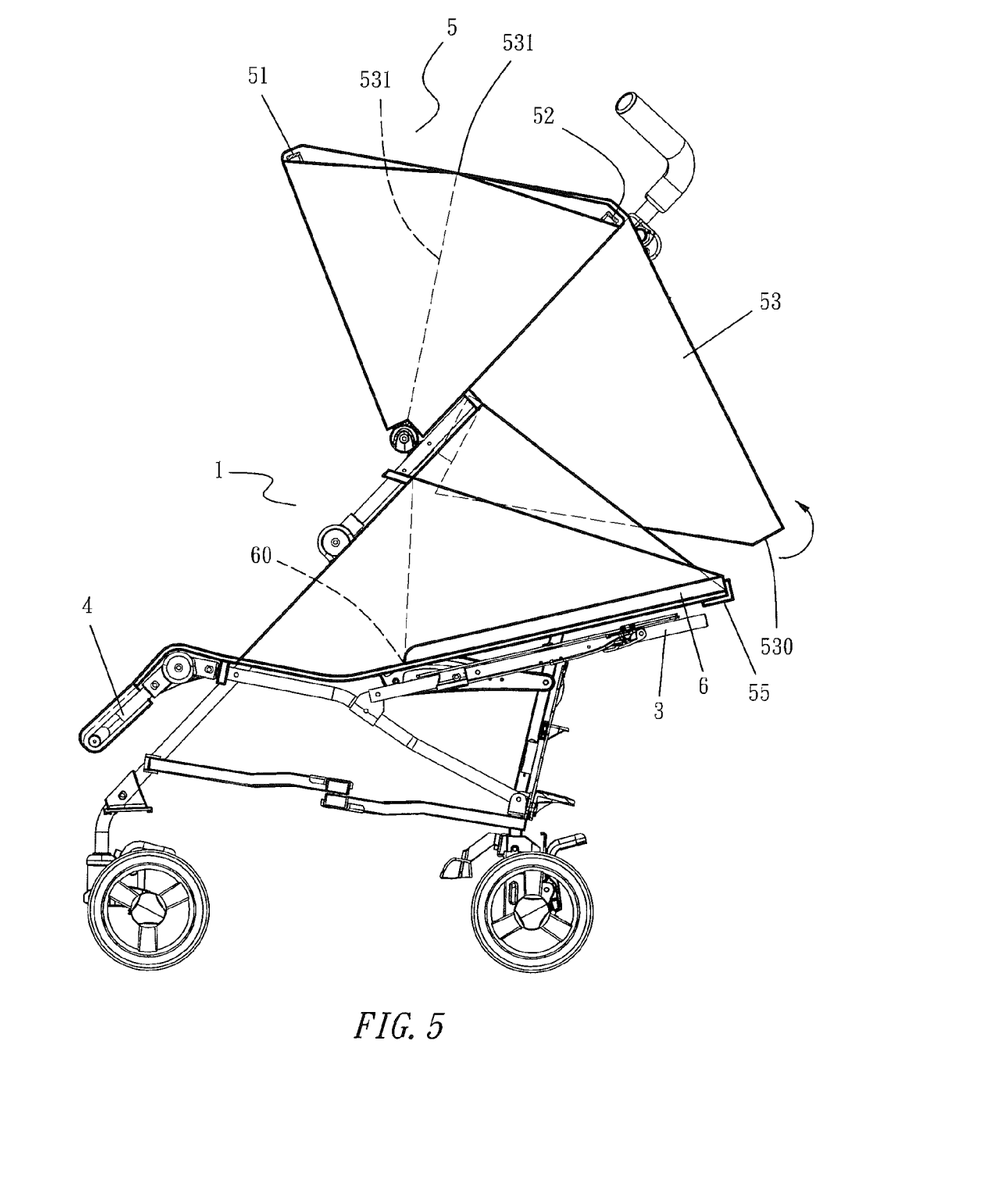
FIG. 5 is a second schematic drawing depicting the movements how the direction of the baby stroller seat is changed according to the preferred embodiment of the present invention.
Figure 6:
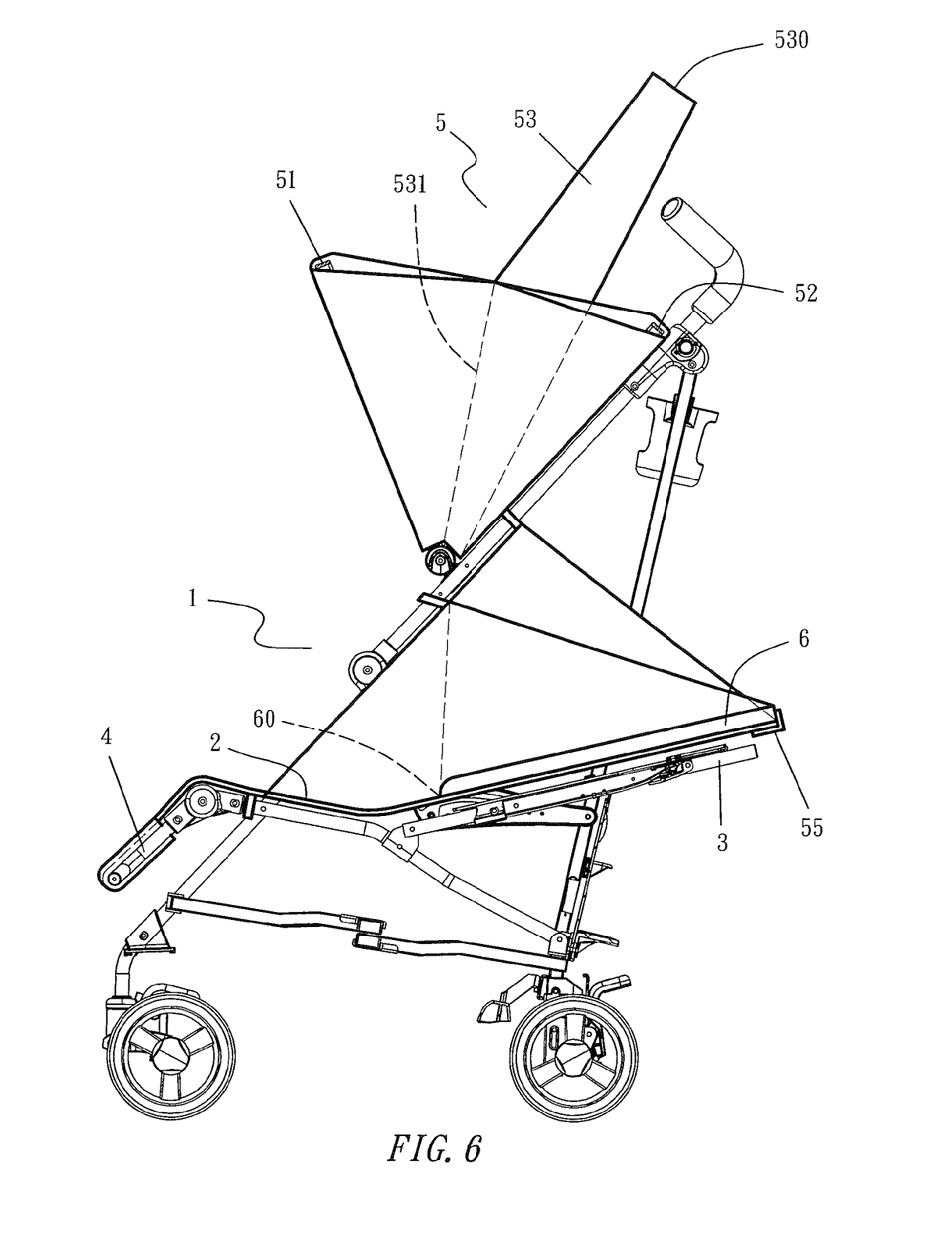
FIG. 6 is a third schematic drawing depicting the movements how the direction of the baby stroller seat is changed according to the preferred embodiment of the present invention.
Figure 7:
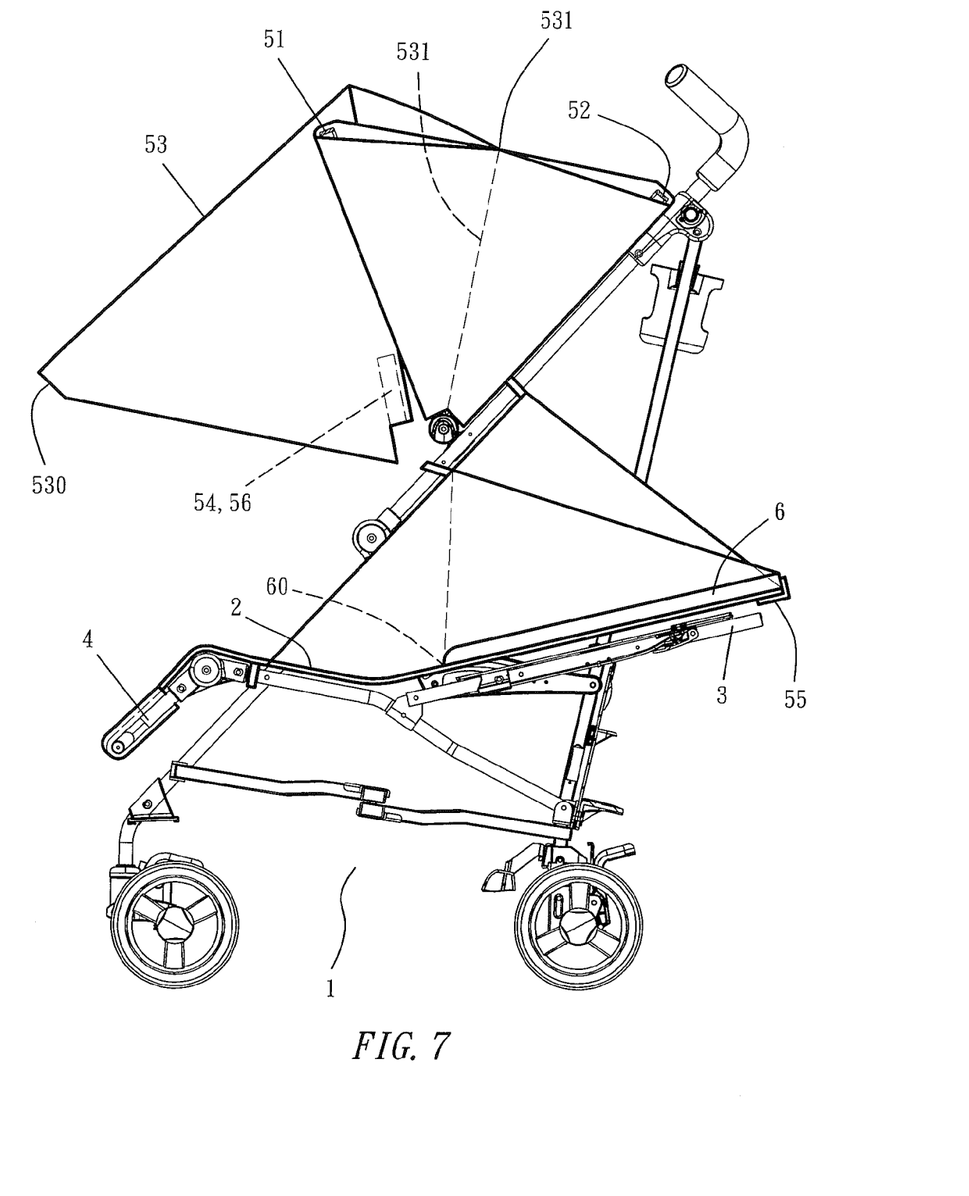
FIG. 7 is a fourth schematic drawing depicting the movements how the direction of the baby stroller seat is changed according to the preferred embodiment of the present invention.
Figure 8:
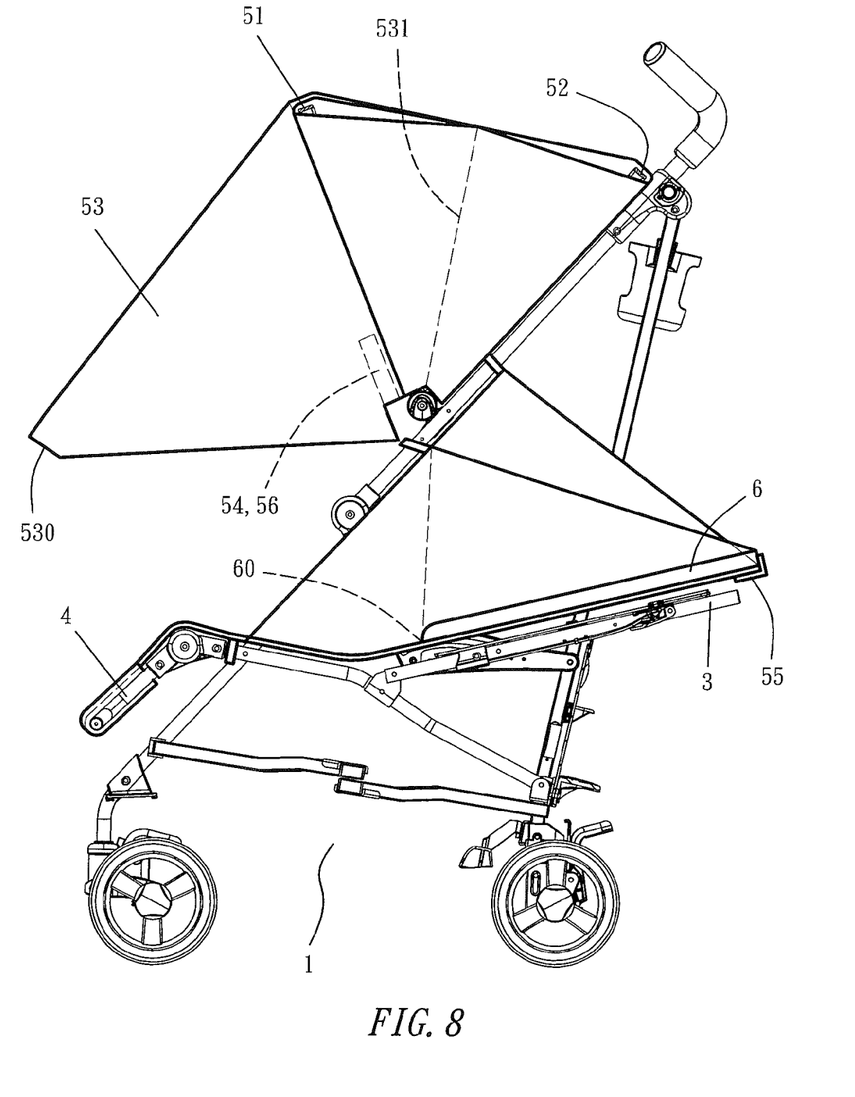
FIG. 8 is a fifth schematic drawing depicting the movements how the direction of the baby stroller seat is changed according to the preferred embodiment of the present invention.
Figure 9:
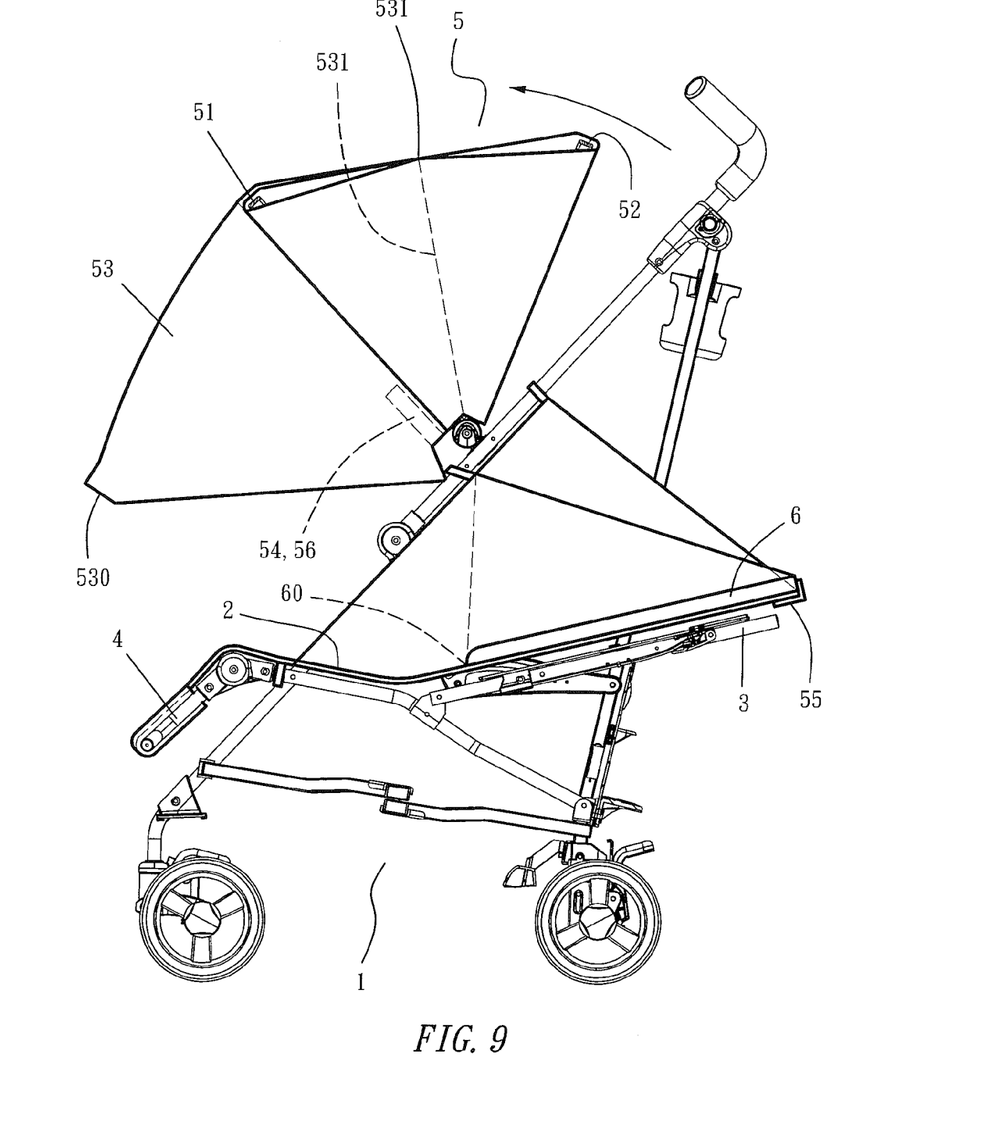
FIG. 9 is a sixth schematic drawing depicting the movements how the direction of the baby stroller seat is changed according to the preferred embodiment of the present invention.
Figure 10:
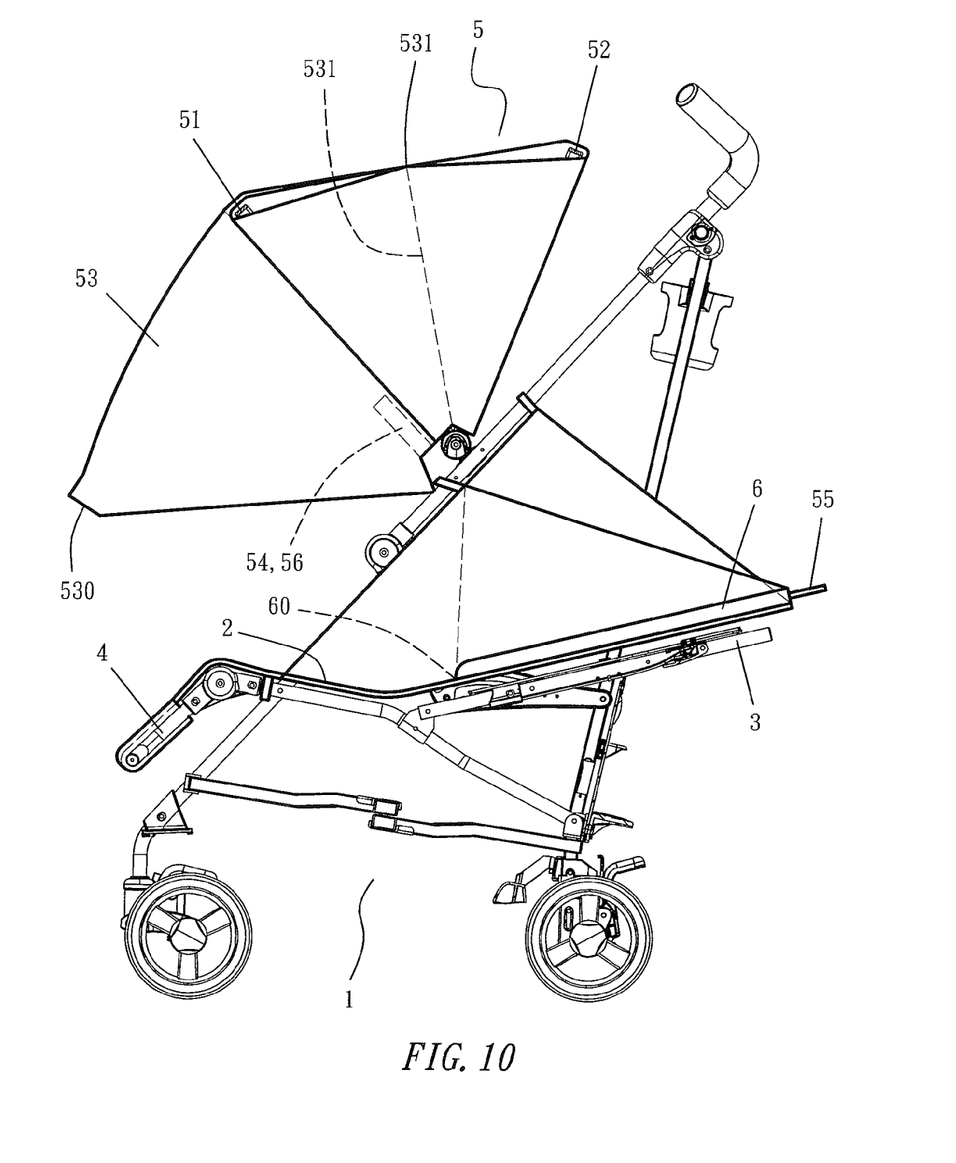
FIG. 10 is a seventh schematic drawing depicting the movements how the direction of the baby stroller seat is changed according to the preferred embodiment of the present invention.
Figure 11:
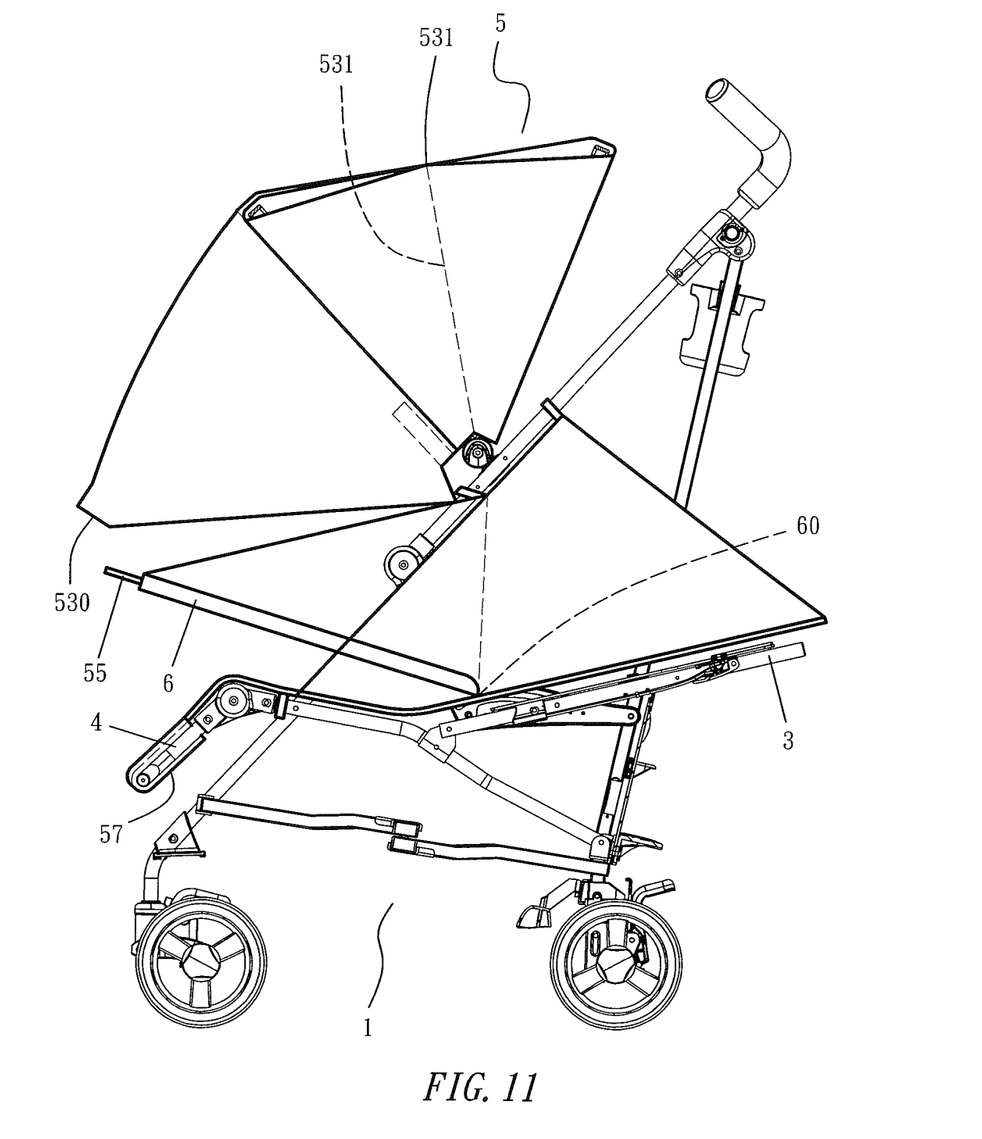
FIG. 11 is an eighth schematic drawing depicting the movements how the direction of the baby stroller seat is changed according to the preferred embodiment of the present invention.
Figure 12:
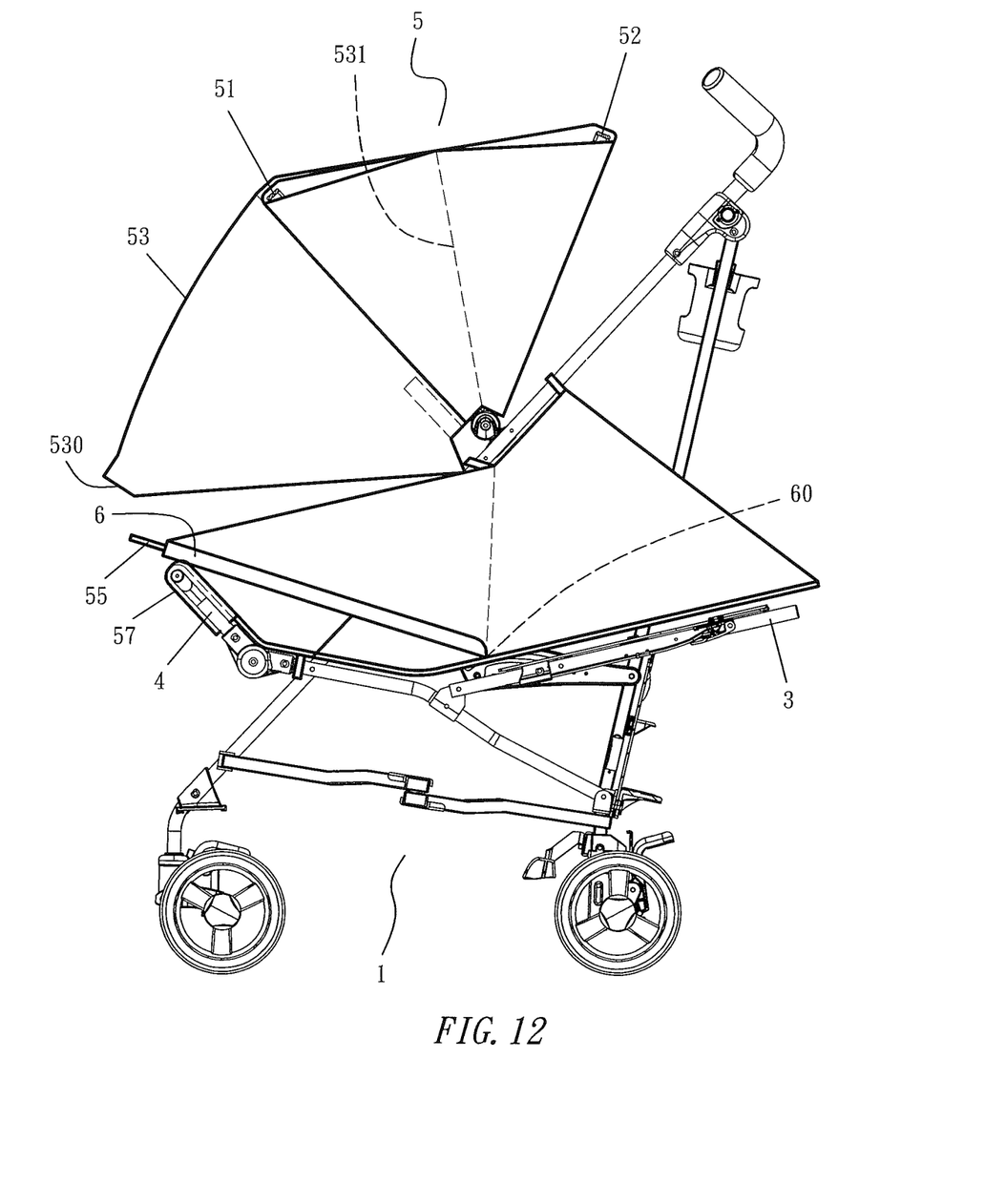
FIG. 12 is a ninth schematic drawing depicting the movements how the direction of the baby stroller seat is changed according to the preferred embodiment of the present invention.
Figure 13:
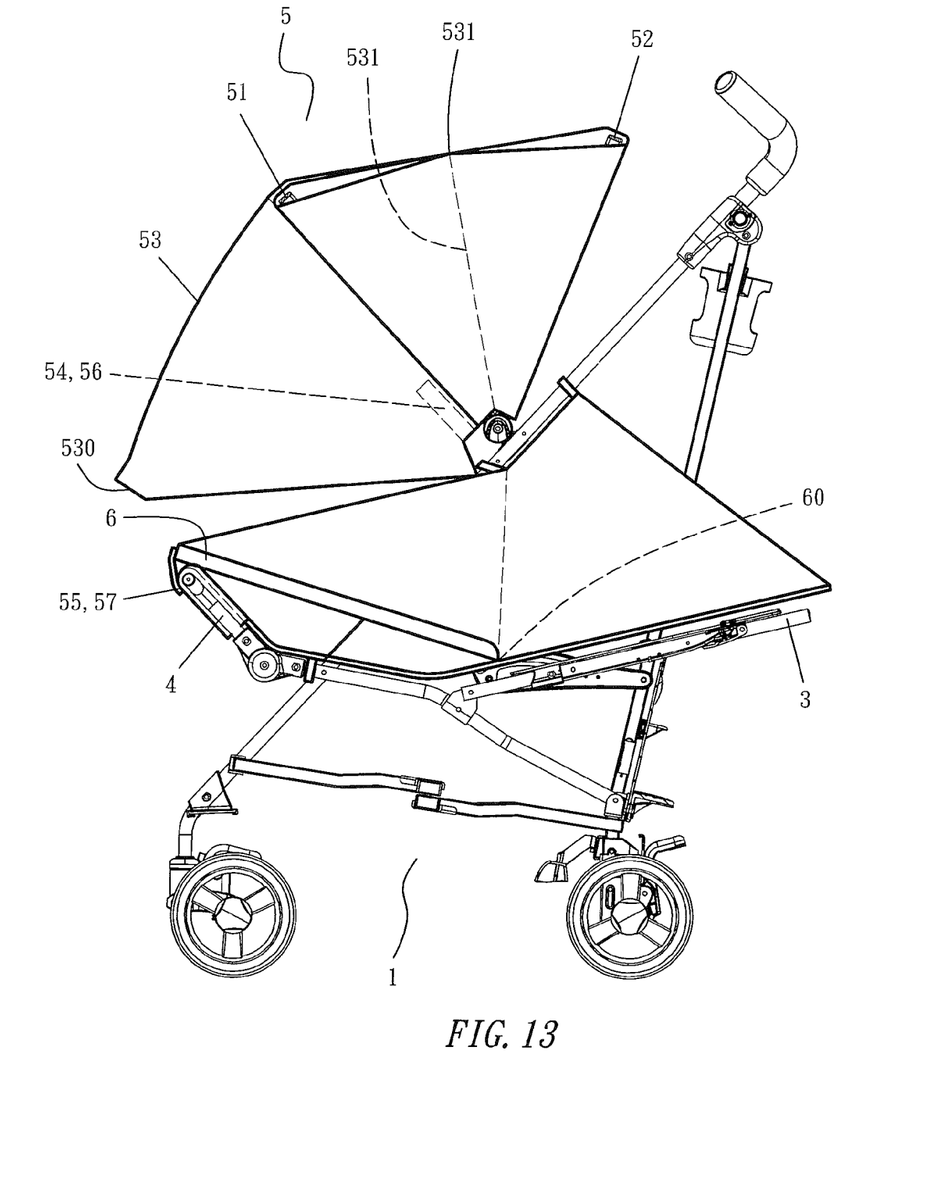
FIG. 13 is a tenth schematic drawing depicting the movements how the direction of the baby stroller seat is changed according to the preferred embodiment of the present invention.
Figure 14:
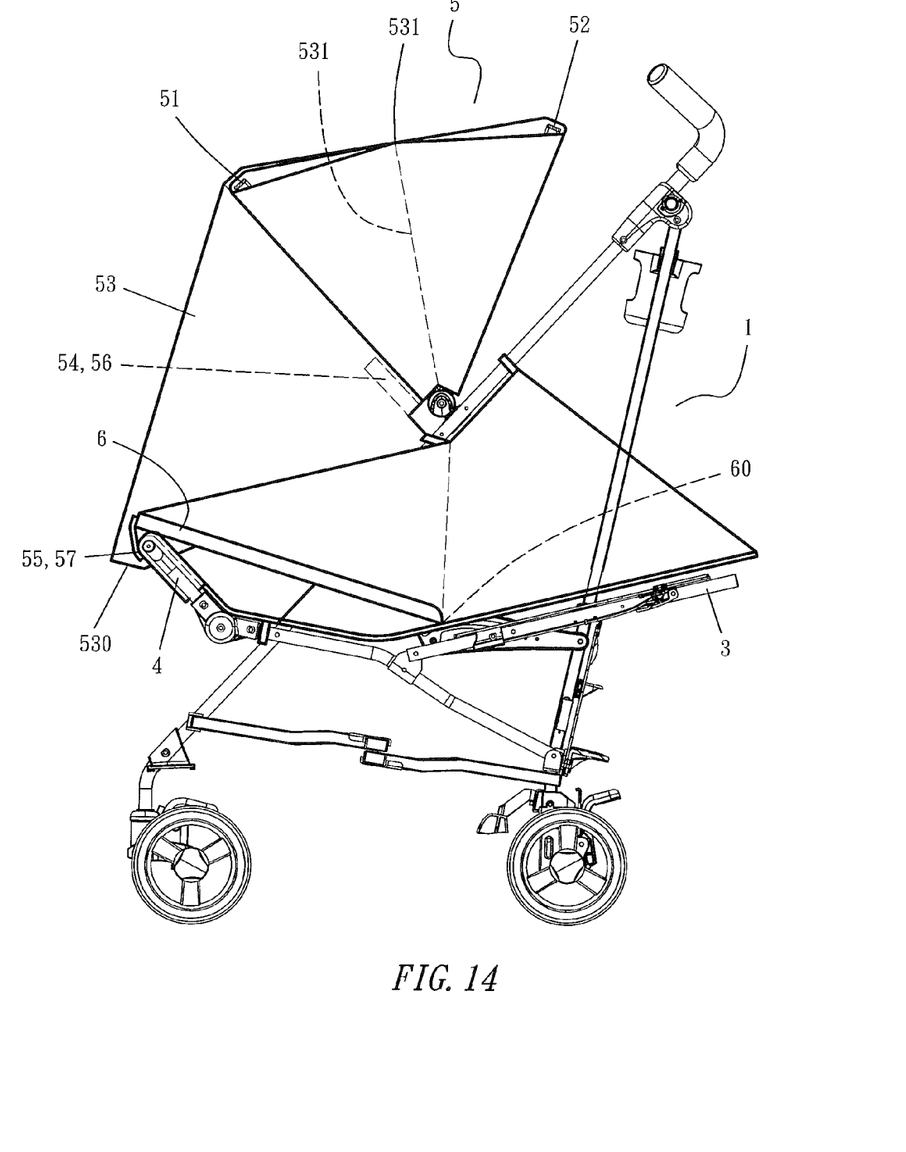
FIG. 14 is a sectional schematic drawing showing the baby stroller seat has completed its direction-change according to the preferred embodiment of the present invention.
Figure 15:
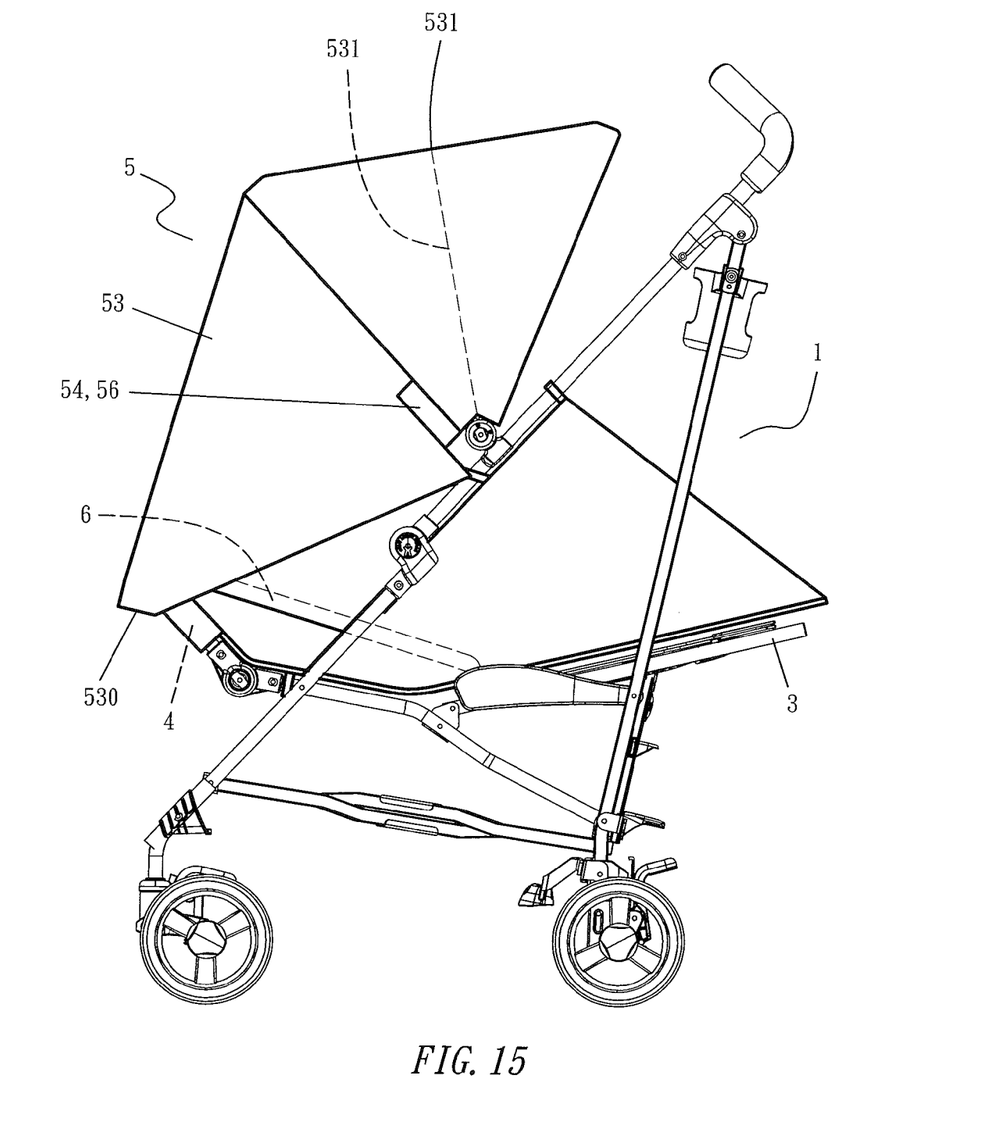
FIG. 15 is a side view showing the baby stroller seat has completed its direction-change according to the preferred embodiment of the present invention.

FIGS. 4 to 13 show a sequence of movements how the direction of the baby stroller seat is changed. First, the second fastening element 56 on the slit 54 of each bilateral side of the rear canopy 53 needs to be pulled apart, and the first fastening element 55 on the hanging-down bottom end 530 of the rear canopy 53 also needs to be separated, as shown in FIG. 4. Next, the rear sunshade rib 52 needs to be held and the bottom end 530 of the rear canopy 53 needs to be grasped to turn over toward the top of the frame 1, as shown in FIGS. 5 and 6. Thus, the rear canopy 53 and the bottom end 530 of the rear canopy 53 are allowed to be turned over frontward to the front side of the frame 1 via the switching line 531. The front sunshade rib 51 and the rear sunshade rib 52 need moving toward the front side of the frame 1 to set its position, and, then, the second fastening element 56 on the slit 54 of the bilateral edges of the rear canopy 53 needs to be fastened together, as shown in FIG. 7 to FIG. 10. The auxiliary backrest 6 needs pivot turning and moving toward the front end of the frame 1 via the sewing thread line 60, as shown in FIG. 11 to FIG. 13. Further, the footrest 4 needs to be adjusted up to support the auxiliary backrest 6. The first fastening element 55 of the auxiliary backrest 6 needs to fasten to a third fastening element 57, such as a velcro strip, arranged on the bottom end of the footrest 4. The bottom end 530 of the rear canopy 53 also needs to be fastened to the bottom end of the footrest 4 and to the auxiliary backrest 6 simultaneously to allow the auxiliary backrest 6, the footrest 4 and the bottom end 530 to be fastened together. Consequently, the rear canopy 53 and the footrest 4 may support and hold the auxiliary backrest 6 to allow the baby to lean against after the direction of the seat on the baby stroller is changed, as shown in FIGS. 14 and 15. Thus, the direction changing and setting disclosed in the present invention is completed. Furthermore, the tilting angle of the auxiliary backrest 6 after the direction of the seat is changed may be adjusted by adjusting the elevation angle of the footrest 4, so that the tilting angle of the auxiliary backrest 6 is able to be adjusted to the most comfortable angle and position for the baby.

The present invention discloses a simple and convenient mode for the stroller-users to switch the direction of the sunshade on the baby stroller without changing the frame of the baby stroller. To switch the direction of the sunshade, the only thing that a user needs to do is to take the switching line of the rear canopy fabric as the direction-changing point to turn over the rear canopy to the other side. The present invention may obviously ameliorate the disadvantage of the prior art that the direction-changing of the sunshade on the prior art baby stroller can be achieved only under the condition that the prior art baby stroller is provided with the stroller frame allowing to switch its direction. In addition, the present invention may be disposed on the frame of the baby stroller in the market to achieve the function of changing the sunshade direction, so that the present invention is more creative.

What is claimed is:

1. A direction setting device for a seat of a baby stroller, comprising a frame, a seat inside the frame, a main backrest, a footrest arranged under a front end of the frame, a sunshade arranged at a top of the frame and supported by a front sunshade rib and a rear sunshade rib, a rear canopy having one side secured on a top surface of the sunshade between the front and rear sunshade ribs, and a switching line for turning over the rear canopy formed at the joints of the rear canopy and the sunshade, wherein another side of the rear canopy is provided with a bottom end hanging down, wherein each bilateral side of the rear canopy relating to and extending along the rear sunshade rib is provided with a slit whose bilateral edges are fastened to each other by a fastening element, wherein a side of the main backrest facing the front end of the frame is provided with an auxiliary backrest, wherein the auxiliary backrest and the footrest are fastened together, with the rear canopy and the footrest supporting and holding the auxiliary backrest after the rear canopy is turned over to the front side of the frame, wherein the auxiliary backrest is a fabric cover stuffed with a supporting member and whose bottom end is sewed together with the seat fabric arranged on the frame to form a sewing thread line, wherein the auxiliary backrest moves to the front end of the frame via the sewing thread line to change and set a direction of the seat; and wherein the rear canopy is fastened to the auxiliary backrest and to the footrest respectively by another fastening element after the direction of the baby seat is switched.

2. The direction setting device for the seat of a baby stroller according to claim 1, wherein the fastening elements are velcro strips.

3. The direction setting device for the seat of a baby stroller according to claim 1, wherein the footrest is adjustable to multiple elevation angles and the tilting angle of the auxiliary backrest is controlled by adjusting the elevation angle of the footrest.

4. A direction setting device for a seat of a baby stroller, comprising a frame, a seat inside the frame, a main backrest, a footrest arranged under a front end of the frame, a sunshade arranged at a top of the frame and supported by a front sunshade rib and a rear sunshade rib, a rear canopy having one side secured on a top surface of the sunshade between the front and rear sunshade ribs, and a switching line for turning over the rear canopy formed at the joints of the rear canopy and the sunshade, wherein another side of the rear canopy is provided with a bottom end hanging down, wherein each bilateral side of the rear canopy relating to and extending along the rear sunshade rib is provided with a slit whose bilateral edges are fastened to each other by a fastening element, wherein an auxiliary backrest and the footrest are fastened together, with the rear canopy and the footrest supporting and holding the auxiliary backrest after the rear canopy is turned over to the front side of the frame, and wherein the footrest is adjustable to multiple elevation angles and the tilting angle of the auxiliary backrest is controlled by adjusting the elevation angle of the footrest.

5. The direction setting device for the seat of a baby stroller according to claim 4, wherein a side of the main backrest facing the front end of the frame is provided with the auxiliary backrest, wherein the auxiliary backrest is a fabric cover stuffed with a supporting member and whose bottom end is sewed together with the seat fabric arranged on the frame to form a sewing thread line, and wherein the auxiliary backrest moves to the front end of the frame via the sewing thread line to change and set a direction of the seat.

6. The direction setting device for the seat of a baby stroller according to claim 4, wherein the fastening element is a velcro strip.

* * * * *